(12) United States Patent
Kim et al.

(10) Patent No.: US 8,565,828 B2
(45) Date of Patent: Oct. 22, 2013

(54) MOBILE TERMINAL HAVING TOUCH SENSOR-EQUIPPED INPUT DEVICE AND CONTROL METHOD THEREOF

(75) Inventors: Jun-Hee Kim, Seoul (KR); Sang-Yeon Lim, Seoul (KR); Seong-Yoon Cho, Seoul (KR); Jae-Keun Kim, Gyeonggi-Do (KR); Hoi-Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 521 days.

(21) Appl. No.: 12/482,052

(22) Filed: Jun. 10, 2009

(65) Prior Publication Data
US 2010/0099463 A1 Apr. 22, 2010

(30) Foreign Application Priority Data

Oct. 16, 2008 (KR) ........................ 10-2008-0101743

(51) Int. Cl.
| | |
|---|---|
| H04B 1/38 | (2006.01) |
| H04M 1/00 | (2006.01) |
| G09G 5/00 | (2006.01) |
| G06F 3/02 | (2006.01) |
| G06F 3/041 | (2006.01) |
| G06F 1/16 | (2006.01) |
| G06F 3/01 | (2006.01) |
| H05K 5/00 | (2006.01) |
| H05K 7/00 | (2006.01) |

(52) U.S. Cl.
USPC ............... 455/566; 455/575.1; 455/575.4; 345/156; 345/168; 345/173; 361/679.3; 715/702

(58) Field of Classification Search
USPC ............ 455/414.1, 566, 575.1, 575.3, 575.4; 340/7.55, 686.1; 345/102, 156, 168, 345/169, 173, 174, 179; 379/90.1, 433.07, 379/403.11; 715/702, 763, 858
See application file for complete search history.

(56) References Cited

U.S. PATENT DOCUMENTS

| | | | |
|---|---|---|---|
| 5,666,113 A | * 9/1997 | Logan | 341/34 |
| 7,692,667 B2 | * 4/2010 | Nguyen et al. | 345/619 |
| 8,108,014 B2 | * 1/2012 | Demuynck | 455/575.1 |
| 2001/0049296 A1 | * 12/2001 | Lee et al. | 455/566 |
| 2004/0196270 A1 | * 10/2004 | Chiu et al. | 345/174 |
| 2006/0287015 A1 | * 12/2006 | Dunko | 455/575.4 |
| 2007/0049358 A1 | * 3/2007 | Kang et al. | 455/575.1 |
| 2008/0070644 A1 | * 3/2008 | Park et al. | 455/575.3 |
| 2008/0117174 A1 | * 5/2008 | Hawkins et al. | 345/169 |
| 2008/0207273 A1 | * 8/2008 | Huo | 455/566 |
| 2008/0297485 A1 | * 12/2008 | Park | 345/173 |

FOREIGN PATENT DOCUMENTS

| | | | |
|---|---|---|---|
| GB | 2445178 A | * | 7/2008 |
| KR | 20060017042 A | * | 2/2006 |
| KR | 20060032033 A | * | 4/2006 |

* cited by examiner

*Primary Examiner* — Fayyaz Alam
*Assistant Examiner* — Paul P Tran
(74) *Attorney, Agent, or Firm* — KED & Associates LLP

(57) ABSTRACT

A mobile terminal having a touch sensor-equipped input device and its control method are disclosed. The mobile terminal includes: a user input unit in which a keypad-printed layer and a touch sensor overlap with each other; and a controller that controls an operation mode of the user input unit in a touch pad and/or a touch keypad mode according to whether or not a cursor is in use.

12 Claims, 14 Drawing Sheets

MOBILE TERMINAL HAVING TOUCH SENSOR-EQUIPPED INPUT DEVICE AND CONTROL METHOD THEREOF

CROSS REFERENCE TO A RELATED APPLICATION

The present application claims priority to Korean Application No. 10-2008-0101743 filed in Korea on Oct. 16, 2008, the entire contents of which is hereby incorporated by reference in its entirety.

BACKGROUND OF THE INVENTION

1. Field of the Invention

The present invention relates to a mobile terminal having a touch sensor-equipped input device and its control method.

2. Description of the Related Art

A mobile terminal such as a personal computer, a notebook computer, a mobile phone, and the like, may be configured to perform diverse functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

In general, the terminals may be divided into a mobile terminal and stationary terminal according to whether or not terminals are movable. In addition, mobile terminals may be divided into a handheld terminal and a vehicle mount terminal according to whether or not users can directly carry it around.

Efforts are ongoing to support and increase the functionality of mobile terminals. Such efforts include software and hardware improvements, as well as changes and improvements in the structural components which form the mobile terminal.

In general, the mobile terminal includes a keypad for generating input data according to a user manipulation, direction keys for moving a cursor, and function keys for executing particular functions. Recently, efforts are ongoing to provide input devices of various designs and input methods to mobile terminals having a restricted space for user convenience.

SUMMARY OF THE INVENTION

Accordingly, one object of the present invention is to address the above-noted and other problems.

Another object of the present invention is to provide a mobile terminal having an input device with a touch sensor operating as a touch pad and/or a touch keypad, and its control method.

Still another object of the present invention is to provide a mobile terminal having an input device with a touch sensor controlling an operation mode of the input device according to an application program, and its control method.

To achieve these and other advantages and in accordance with the purpose of the present invention, as embodied and broadly described herein, the present invention provides in one aspect a mobile terminal including: a user input unit in which a keypad-printed layer and a touch sensor overlap with each other; and a controller that controls an operation mode of the user input unit in a touch pad and/or a touch keypad mode according to whether or not a cursor is in use.

To achieve these and other advantages and in accordance with the purpose of the present invention, as embodied and broadly described herein, the present invention provides in another aspect a method for controlling an input device of a mobile terminal, including: checking whether a cursor is in use when a certain function is executed; and activating an operation mode of the input device as a touch pad and/or touch keypad mode according to whether or not he cursor is in use.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings.

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

Figure 1:
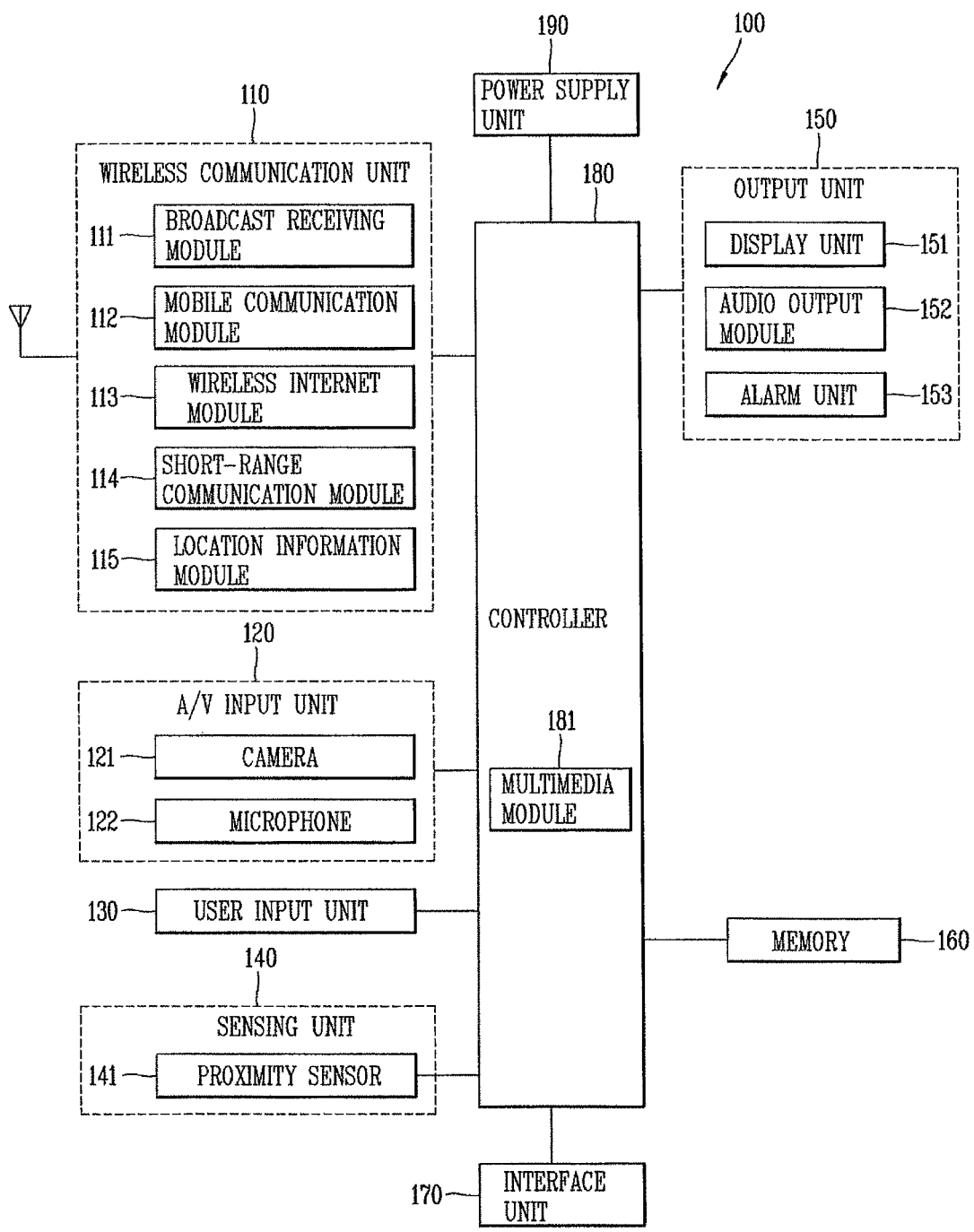
FIG. 1 is a schematic block diagram of a mobile terminal implementing an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The ANV input unit 120 is configured to receive an audio or video signal. The ANV input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may be operated as a signal for recognizing that the mobile terminal is accurately mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. Atypical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3.

The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
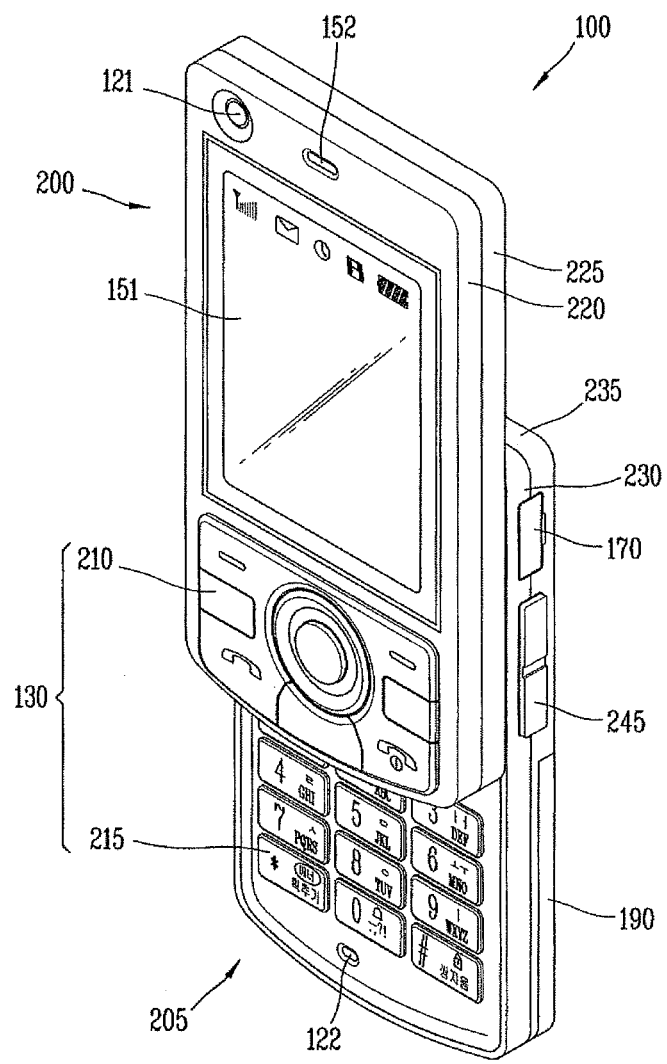
FIG. 2 is a front perspective view of a mobile terminal implementing an embodiment of the present invention.

FIG. 2 is a front perspective view of the mobile terminal according to an embodiment of the present invention.

The mobile terminal 100 according to the present invention includes a first body 200, and a second body 205 that can be slidably moved along at least one direction with respect to the first body 200. In case of a folder type mobile phone, the mobile terminal 100 may include a first body and a second body having one side that can be folded or unfolded with respect to the first body.

A state in which the first body is disposed to overlap with the second body 205 may be called a closed configuration, and as shown in FIG. 2, a state in which at least a portion of the second body 205 is exposed may be called an open configuration.

Although not shown, the mobile terminal according to the present invention may be the folder type mobile terminal including the first body and the second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal can be easily know by the person in the art without any explanation, so its detailed description will be omitted.

In the closed configuration, the mobile terminal mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

The display unit 151, the audio output module 152, the camera 121 or the first user input unit 210 may be located at the first body 200, specifically, on the first front case 220 of the first body 200.

The display unit 151 has been described in relation to FIG. 1, so its detailed description will be omitted for the sake of brevity.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at the second body, specifically, at a front face of the second body 205.

A third user input unit 245, the microphone 122, the interface unit 170 may be disposed on at least one of the second front case 230 and the second rear case 235.

The first to third user input units 210, 215 and 245 may be generally referred to as a manipulating portion 130, and various methods and techniques can be employed for the manipulation unit so long as they can be operated by the user in a tactile manner.

For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like. The first user input unit 210 may include a soft key used by interworking with icons displayed on the display unit 151 and navigation key (largely including four direction keys and a central key) for indicating and checking directions.

Also, the third user input unit 245 may support the so-called hot key functions that allow more convenient activation of particular functions for the mobile terminal.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. The interface unit 170 has been described in relation to FIG. 1, so its detailed description will be omitted.

The power supply unit 190 for supplying power to the terminal may be located at the second rear case 235.

The power supply unit 190 may be, for example, a rechargeable battery that can be detached.

Figure 3:
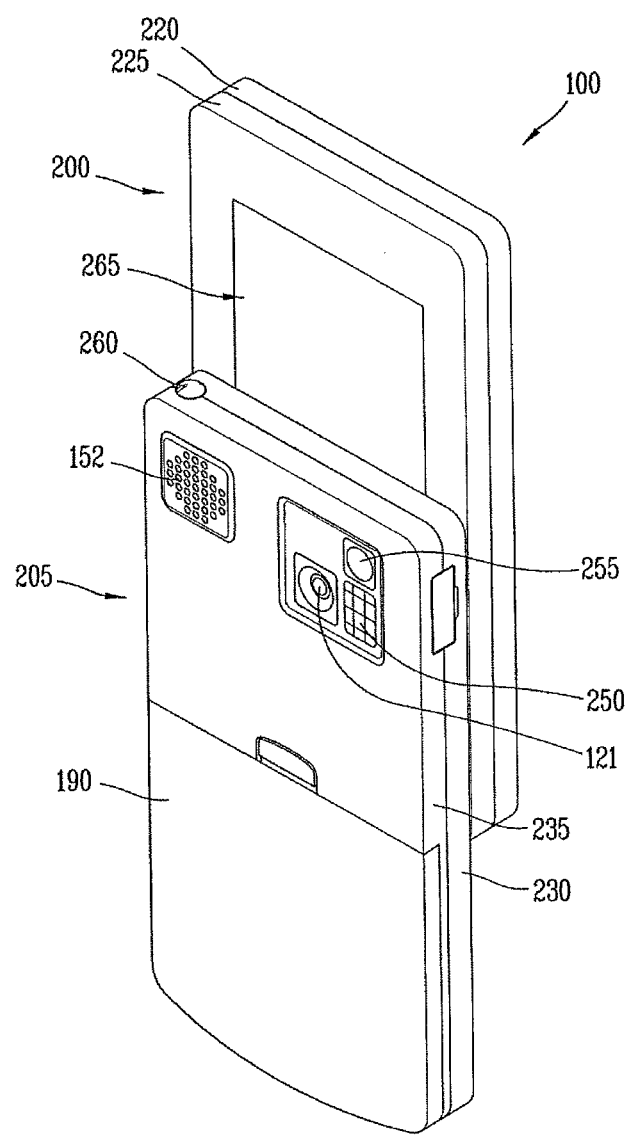
FIG. 3 is a rear perspective view of a mobile terminal implementing an embodiment of the present invention.

FIG. 3 is a rear perspective view of the mobile terminal of FIG. 2 according to an exemplary embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera of the first body 200 may operate with a relatively lower resolution to capture an image(s) of the user's face and immediately transmit such image(s) to another party in real-time during video call communication or the like in which reverse link bandwidth capabilities may be limited. Also, the camera of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152. The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed as shown in the drawing, The second camera 121 and other components may be disposed on the second body 205, but such configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
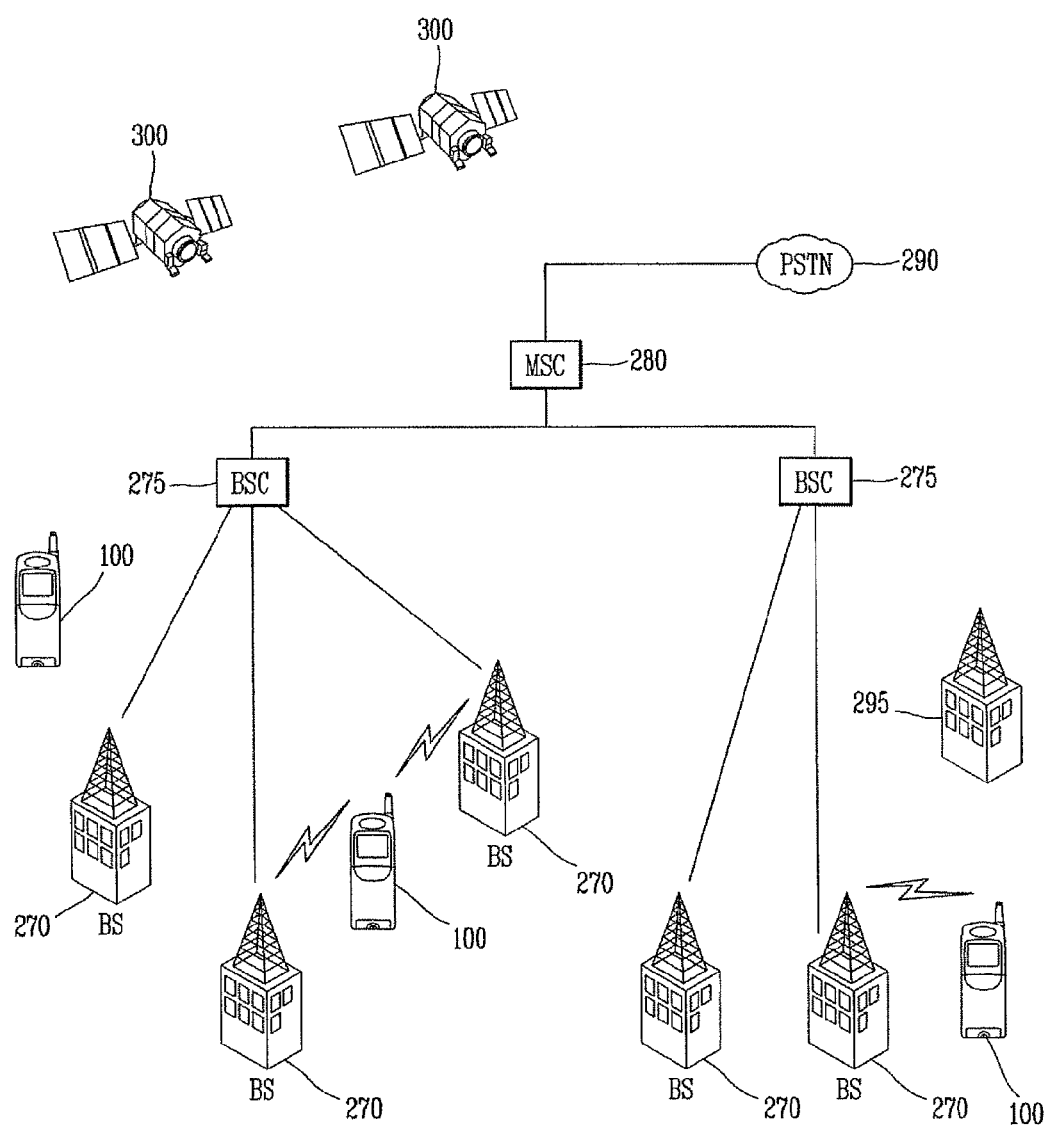
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 4, several global positioning systems (GPS) satellites 300 are shown. The satellites 300 help locate at least one of a plurality of terminals 100.

In FIG. 4, several satellites 300 are depicted, but it is understood that useful positioning information may be obtained with any number of satellites. The GPS module 115 as shown in FIG. 1 is typically configured to cooperate with the satellites 300 to obtain desired positioning information.

Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270.

The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Figure 5:
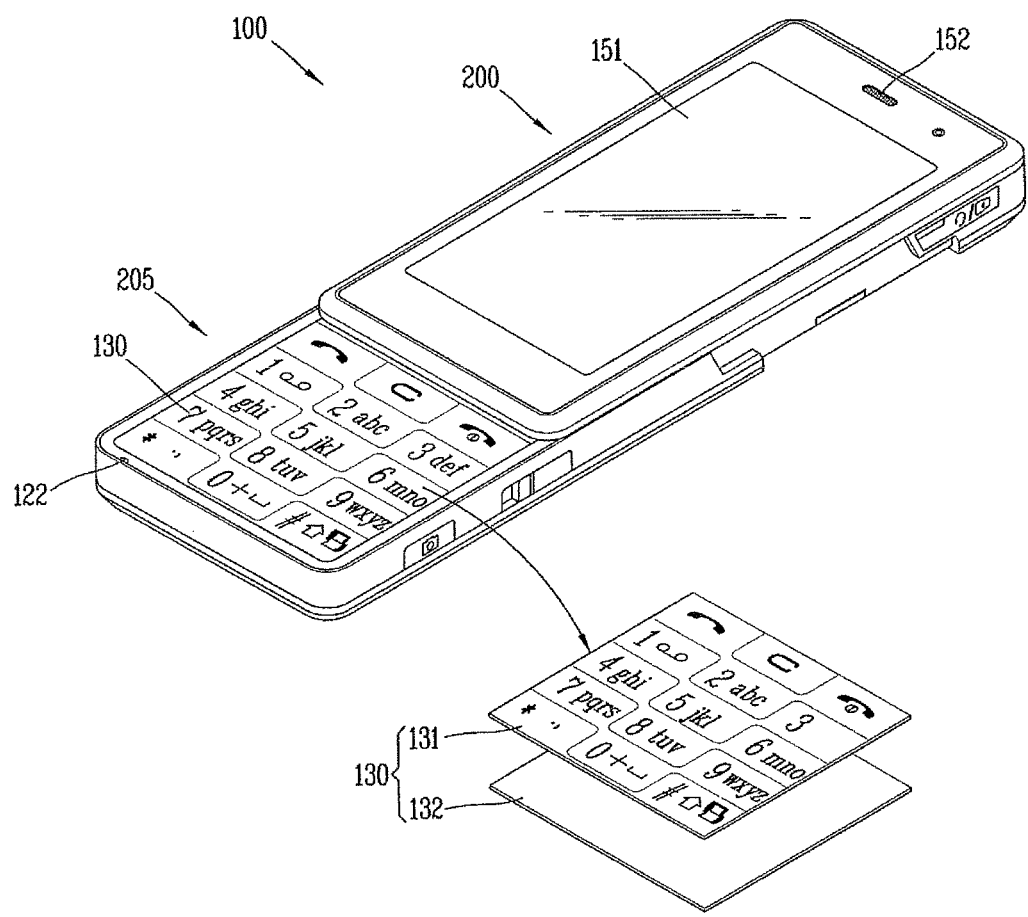
FIG. 5 is a front perspective view of the mobile terminal having a touch sensor-equipped input device according to an embodiment of the present invention.

FIG. 5 is a front perspective view of the mobile terminal having a touch sensor-equipped input device according to an embodiment of the present invention. In this embodiment, a slide type mobile terminal 100 is exemplarily described.

The mobile terminal 100 according to the present invention includes a first body 200 and a second body 205 configured to be slid along at least one direction with respect to the first body 200.

The display unit 151 and the audio output module 152 may be disposed on the first body 200.

The display unit 151 and a touch pad may be overlaid in a layered manner to form a touch screen. Accordingly, the display unit 151 may be used also as an input device as well as as a display device.

The audio output module 152 may be implemented as a speaker that converts an audio signal into an audible frequency and outputs the same.

The microphone 122 and the user input unit 130 may be disposed on the second body 205.

As described above, the microphone 122 may be implemented in a suitable form to receive the user's voice, and other sounds.

The user input unit 130 is a dual input device that can be used as a touch keypad and/or touch pad (mouse pad). The user input unit 130 may include a layer 131 with characters, numbers, special symbols (*, #), and the like, printed on one surface thereof, and a touch sensor 132 disposed to overlap with the layer. For example, the user input unit 130 may include glass with a keypad printed on one surface thereof and a touch sensor contacting with the glass in an overlap manner.

When the user input unit 130 is activated in a touch keypad mode and a touch of a pointer is detected, the user input unit 130 transmits position information about the touched point to the controller 180 when the touch is released. Here, with the touch keypad mode of the user input unit 130 activated, the controller 180 divides the overall area of the user input unit 130 into a certain number of regions and allocates keys of the keypad to each region.

The controller 180 recognizes a key input corresponding to the received position information. Namely, the controller 180 recognizes a key input mapped to the touched point and displays a character allocated to the key on a display screen. Here, the character may include Hangul, English, numbers, special symbols, and the like.

Meanwhile, when the user input unit 103 is activated as a touch pad, the user input unit 130 detects a touch input (gesture recognition) of the pointer and transmits it to the controller 180. Then, the controller 180 controls the cursor displayed on the display unit 151 according to the detected touch input. Namely, the user input unit 130 serves like a mouse that moves a mouse pointer displayed on a monitor of a computer.

For example, when a drag is detected, the cursor is moved according to the movement of the pointer, and when a simple touch is detected, an object indicated by the cursor is selected. Here, the simple touch may be similar to a clicking operation of the mouse.

In addition, the user input unit 130 may include a backlight module (not shown). The backlight unit (not shown) may be turned on or off according to an operation mode of the user input unit 130. For example, when the user input unit 130 operates in the touch keypad mode, the backlight module may be turned on to allow the user to recognize positions of the keys constituting the touch keypad. Meanwhile, when the user input unit 130 operates in the touch pad mode, the backlight module is turned off so that the user cannot recognize positions of the printed keys. Namely, the user input unit 130 may be implemented in the same shape as a touch pad of a general notebook computer.

The sensing unit 140 may detect sliding up/down of the mobile terminal 100. For example, when the first body 200 is slid in one direction to expose a portion of the second body 205, it is detected as a slide-up state, and when the first body 200 overlaps with the front surface of the second body 205, it is detected as a slide-down state.

When the slide-up state is detected by the sensing unit 140, the controller 180 recognizes an open configuration, and when the slide-down state is detected, the controller 180 recognizes a closed configuration. According to a change in the slide state of the mobile terminal 100, the keypad icons (on-screen editor) displayed on the display unit 151 are changed to a physical keypad of the user input unit 130. Conversely, the physical keypad may be changed to the keypad icons.

For example, when the slide-up state is changed to the slide-down state, the controller 180 changes the physical keypad to the keypad icons on the display screen. Meanwhile, when the slide-down state is changed to the slide-up state, the controller 180 changes the keypad icons to the physical keypad activation.

Figure 6:
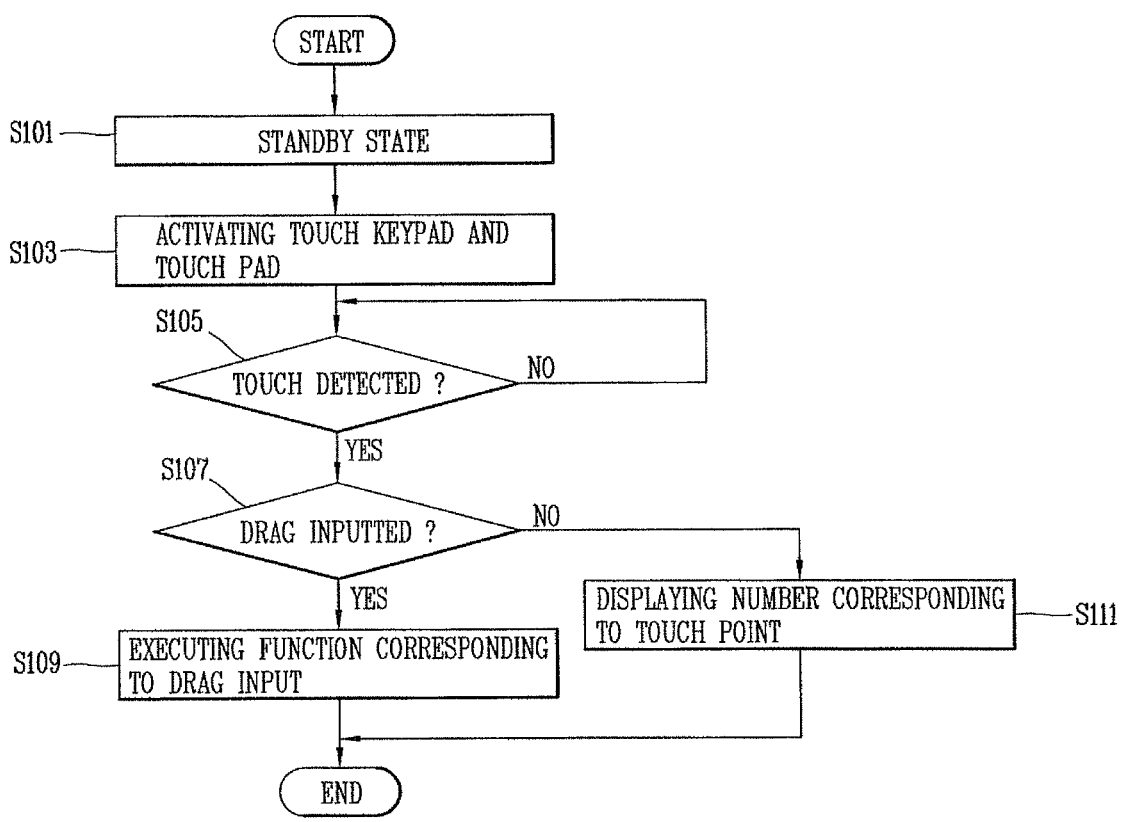
FIG. 6 is a flow chart illustrating a method for controlling the input device of the mobile terminal according to one embodiment of the present invention.

FIG. 6 is a flow chart illustrating a method for controlling the input device of the mobile terminal according to one embodiment of the present invention.

First, when the operation mode of the mobile terminal 100 is changed to a standby state (idle state), the controller 180 activates the touch pad and the touch keypad as an input mode of the user input unit 130 (S101, S103). Namely, when the mobile terminal 100 is in the open configuration, the controller 180 activates the both modes so that the user input unit 130 can be used as the touch pad or the touch keypad. At this time, when the mobile terminal 100 is turned to the open configuration in a state that a touch input of the display unit 151 is set in a locked state, the controller 180 may release the locked touch input.

Thereafter, when a touch of the pointer to the user input unit 130 is detected, the controller 180 checks the detected touch input forms (S105, S107). Namely, the controller 180 checks whether the detected touch input is a drag or a simple touch.

If the detected touch input is a drag, the controller 180 executes a certain function corresponding to the drag input (S109). For example, when the user draws a circle on the user input unit 130 through a dragging operation by using the pointer, the controller 180 executes a text viewer corresponding to the drag input.

If the detected touch input is not a drag in step S107, the controller 180 recognizes a key input corresponding to the detected touch point and receives a character corresponding to the pertinent key (S111). Namely, when the touch applied to the particular point of the user input unit 130 is released, the controller 130 recognizes it as a key input of the touch keypad.

Figure 7:
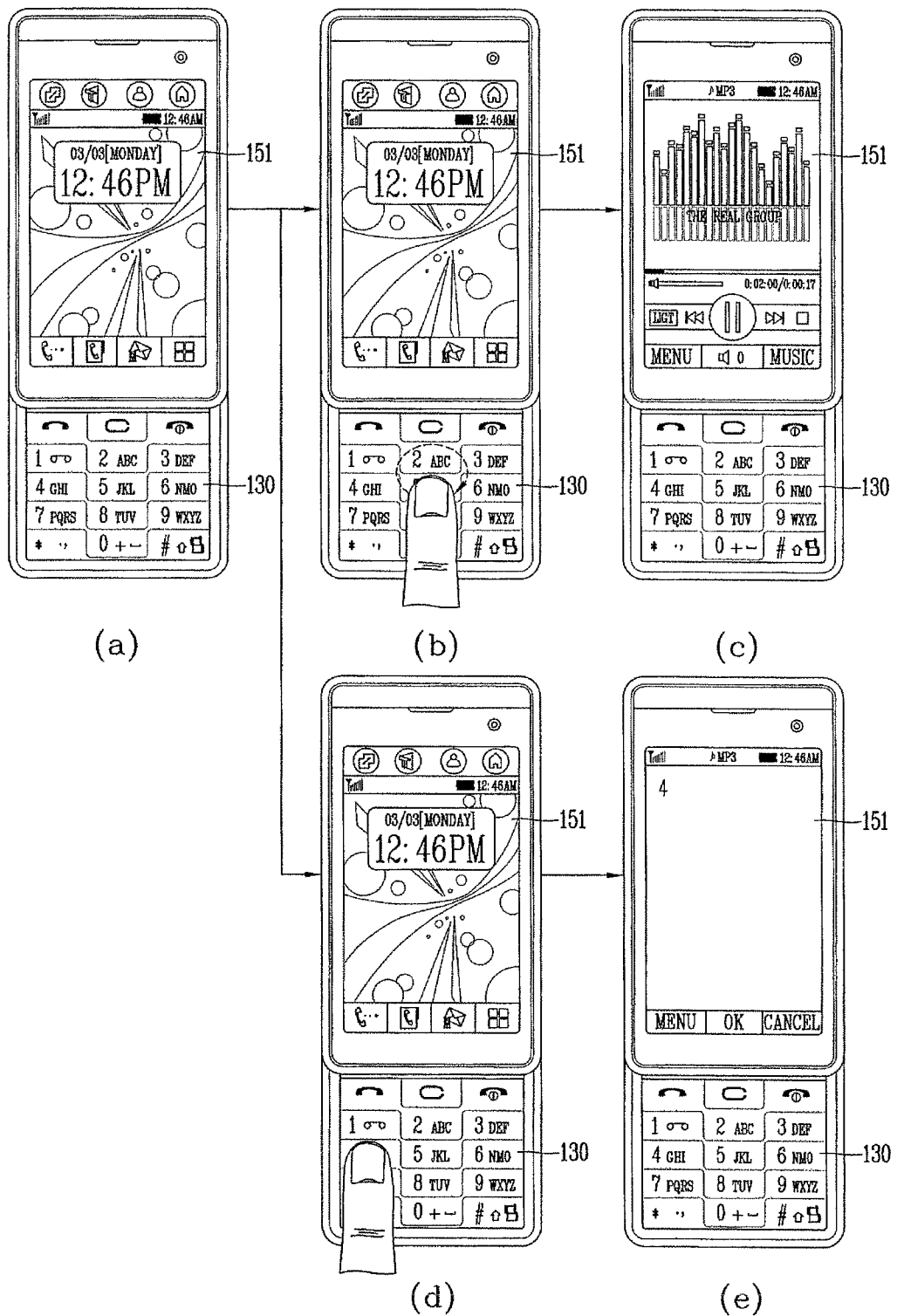
FIG. 7 is an overview of display screens illustrating controlling the input device of the mobile terminal according to the embodiment of FIG. 6.

FIG. 7 is an overview of display screens illustrating controlling the input device of the mobile terminal according to the embodiment of FIG. 6.

First, when the user slides the first body 200 of the mobile terminal 100, the controller 180 detects the slidable operation through the sensing unit 140 and checks the corresponding state. If the mobile terminal 100 is in the open configuration, the controller 180 displays a standby screen image on the display unit 151 (a). At this time, when the display unit 151 is set for a locked touch input, the controller 180 released the locked state of the display unit 151 and displays a standby screen image (background image) on the screen of the display unit 151.

With the standby screen image displayed, when a touch input is generated on the user input unit 130, the controller 180 detects the touch via the touch sensor 132. The detected touch is drag-inputted, the controller executes a function corresponding to the detected drag input. For example, when the user draws a circle in a drag manner on the user input 130, the controller 180 detects the dragging and executes a corresponding music player (b) (c).

Meanwhile, if the detected touch is not a drag input, the controller 180 recognizes the detected touch as a key input corresponding to a point of the detected touch when the touch is released. For example, when the user's finger touches a certain region of the user input unit 130, the controller 180 detects the touch via the sensing unit 140, and when the touch is released, the controller 180 detects the touch, and when the touch is released, the controller 180 receives information about the touched position from the sensing unit 140 and checks a key corresponding to the position. For example, if data mapped to the touch-detected region is '4', the controller 180 recognizes that number key 4 has been inputted, and displays the number 4 on the display screen (d) (e).

Figure 8:
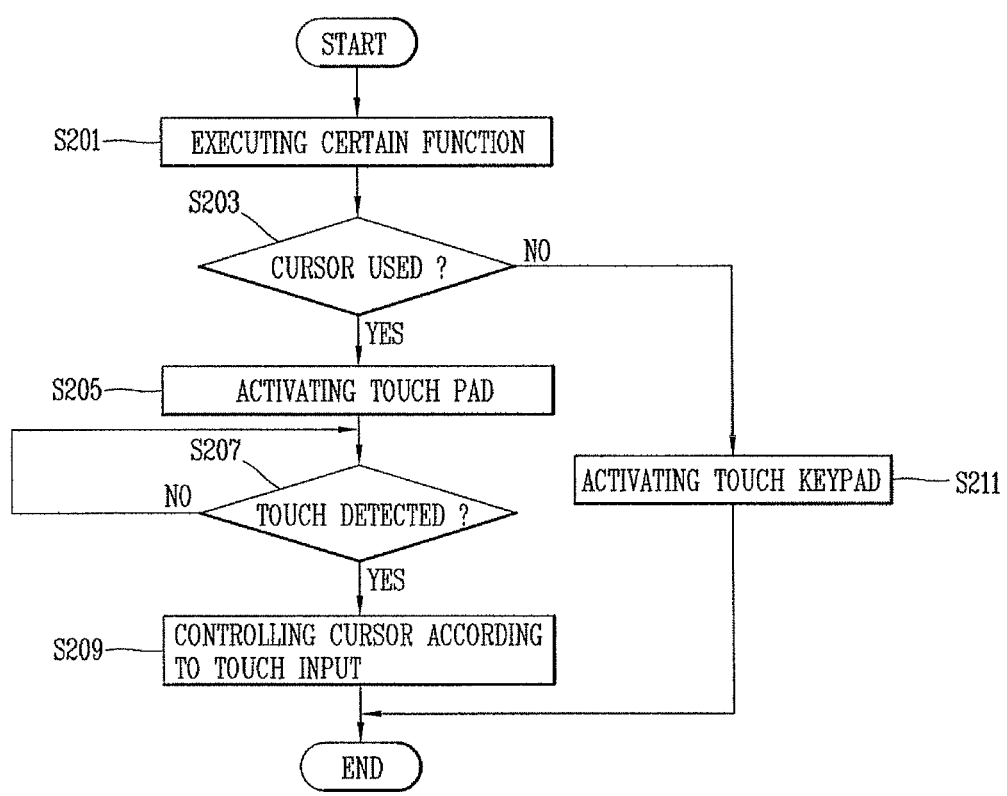
FIG. 8 is a flow chart illustrating a method for controlling the input device of the mobile terminal according to another embodiment of the present invention.

FIG. 8 is a flow chart illustrating a method for controlling the input device of the mobile terminal according to another embodiment of the present invention.

With reference to FIG. 8, when a certain function (application program) is selected through menu manipulation by the user, the controller 180 executes the selected function and checks whether or not the executed function uses a cursor (S201, S203). Here, the use of a cursor may be set by the user according to whether or not each function uses the cursor.

If the function is set to use the cursor, the controller 180 displays the cursor on the selected function-executed screen, and activates the user input unit 130 in a touch pad mode (S205). At this time, the controller 180 deactivates the touch keypad mode of the user input unit 130.

Thereafter, when a touch applied to the user input unit 130 is detected, the controller 180 recognizes a touched position, an input type, a movement path, and the like, via the touch sensor 13 of the user input unit 130 (S207).

The controller controls the cursor displayed on the display screen according to the detected touch input (S209). Namely, the controller 180 checks whether or not the touch input is a selection command or a cursor movement command. For example, if after the pointer touches a first point and the touch on the first point is released without a position movement, the controller 180 recognizes it as a selection command and selects an object of the cursor-positioned point. Meanwhile, when the pointer is moved from the first point to a second point with the touch maintained (i.e., dragging operation), the controller 180 detects the movement path of the pointer and moves the cursor displayed on the display unit 151 along the detected movement path.

When the executed function has not been set to use the cursor, the controller activates the user input unit 130 in the touch keypad mode (S211). Namely, the controller 180 deactivates the touch pad mode of the user input unit 130.

Figure 9A:
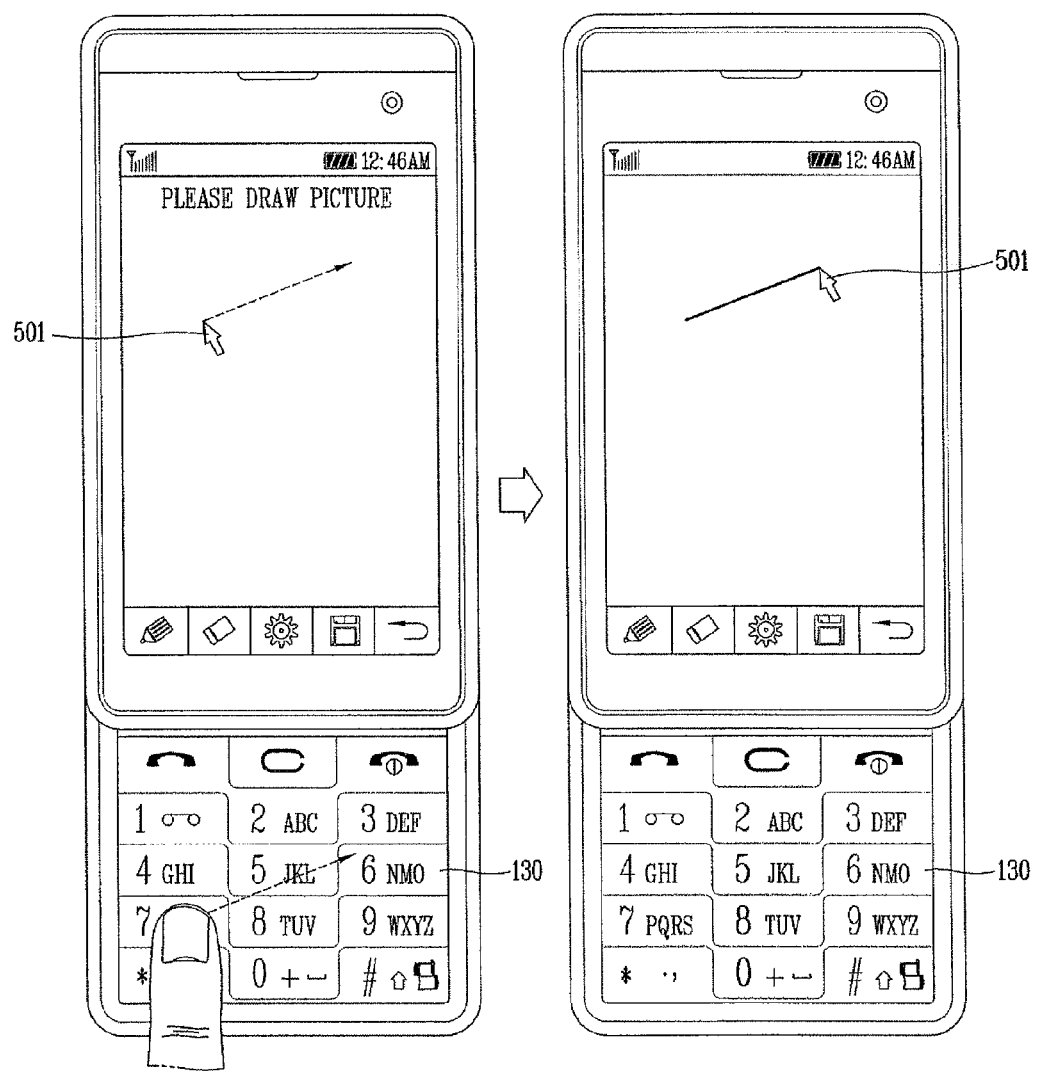
FIGS. 9a and 9b are overviews of display screens illustrating controlling of the input device of the mobile terminal according to the embodiment of FIG. 8.
Figure 9B:
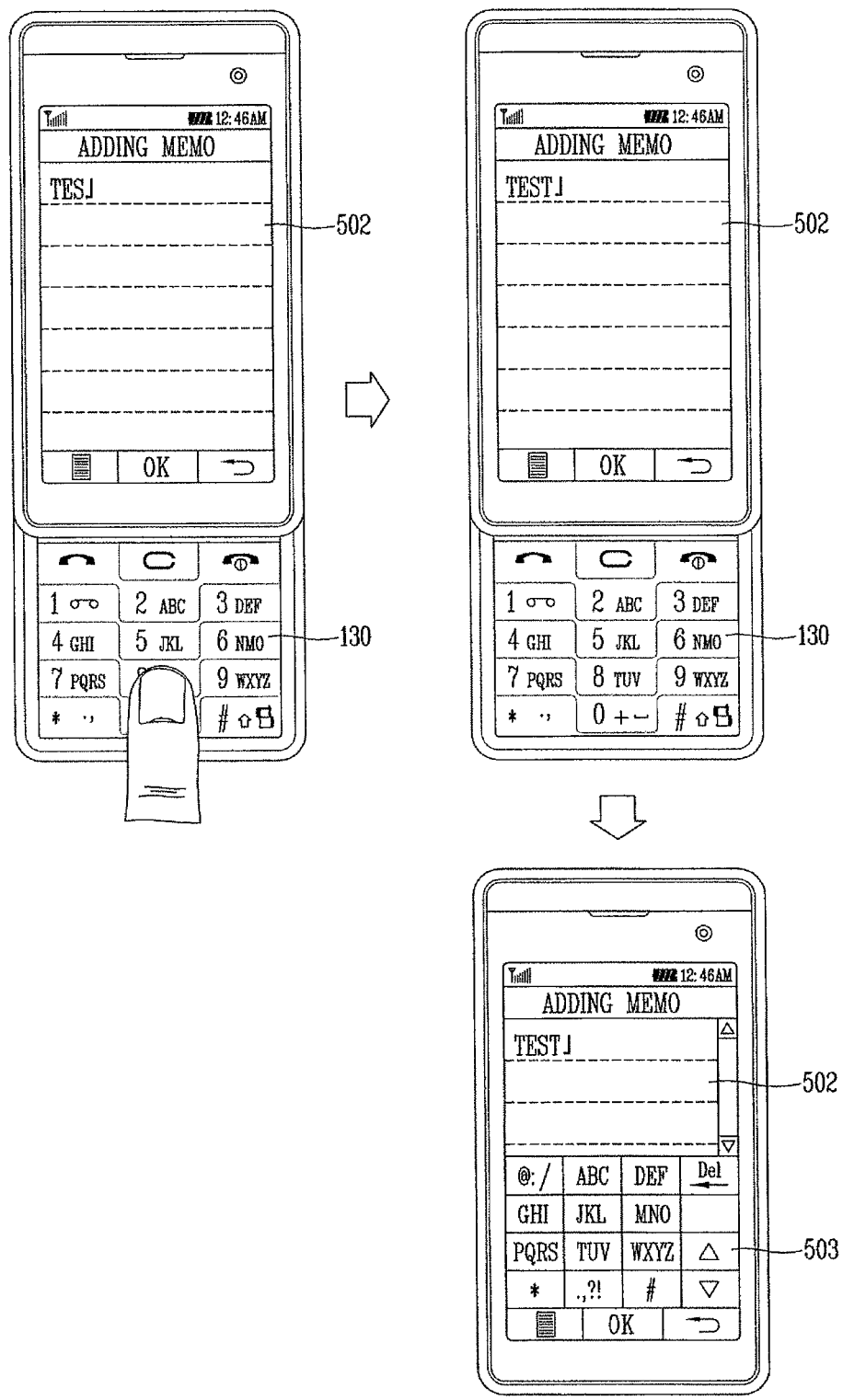

FIGS. 9a and 9b are overviews of display screens illustrating controlling of the input device of the mobile terminal according to the embodiment of FIG. 8.

With reference to FIG. 9a, when a picture memo function is selected through menu manipulation by the user, the controller 180 executes the selected picture memo function and displays an executed screen image on the display unit 151. The controller 180 checks whether the cursor is in use in the picture memo function. If the cursor is in use, the controller 180 displays the cursor 501 on the executed screen. Thereafter, the controller 180 moves the cursor 501 according to dragging inputted via the user input unit 130 and performs drawing along a movement path of the cursor 501.

For example, with the picture memo function executed, when a straight line is drawn according to a dragging operation on the user input unit 130, the controller 180 detects the dragging operation via the sensing unit, moves the cursor 501 according to the dragging operation, and displays a straight line along the movement path of the cursor 501 in the picture memo window displayed on the display unit 151.

With reference to FIG. 9b, when the memo function is selected through menu manipulation, the controller 140 checks whether the mobile terminal 100 is in an open configuration. If the mobile terminal 100 is in the open configuration, the controller 180 displays only a text input window 502 on the display unit 151. And the controller 180 checks whether the cursor is to be used, and if the use of the cursor is not necessary, the controller 180 activates the touch keypad mode of the user input unit 130 and deactivates the touch pad mode. With the touch keypad mode of the user input unit 130 activated, when a touch applied to the user input unit 130 is detected, the controller 180 checks a character corresponding to the touch-detected point and display it on the text input window 502. Namely, the controller 180 recognizes the touch as a key select command of the keypad and recognizes it as a text input corresponding to a pertinent key.

For example, if the touch point is a region allocated with key No. 8, the controller 180 recognizes the touch as an input of a character 't' corresponding to the key No. 8 and inputs 't' to the text input window 502.

If the slide is closed during the text input, namely, when the mobile terminal 100 is in a closed configuration, the controller 180 reduces the region of the text input window 502 and displays a keypad icon 503 at a display region generated resulting from the reduction in the text input window 502. Accordingly, the user can input text through the keypad icon 503. Namely, the user can input text by using the display unit 151 implemented as a touch screen as an input device.

In this embodiment, the case where the region at which the text input window 502 is reduced and the keypad icon 503 is displayed at the display region generated resulting from the reduction of the text input window 502 is taken as an example, but the keypad icon 503 may be overlaid with a portion of the text input window 502. At this time, the keypad icon 503 may be implemented to have certain transparency.

Figure 10:
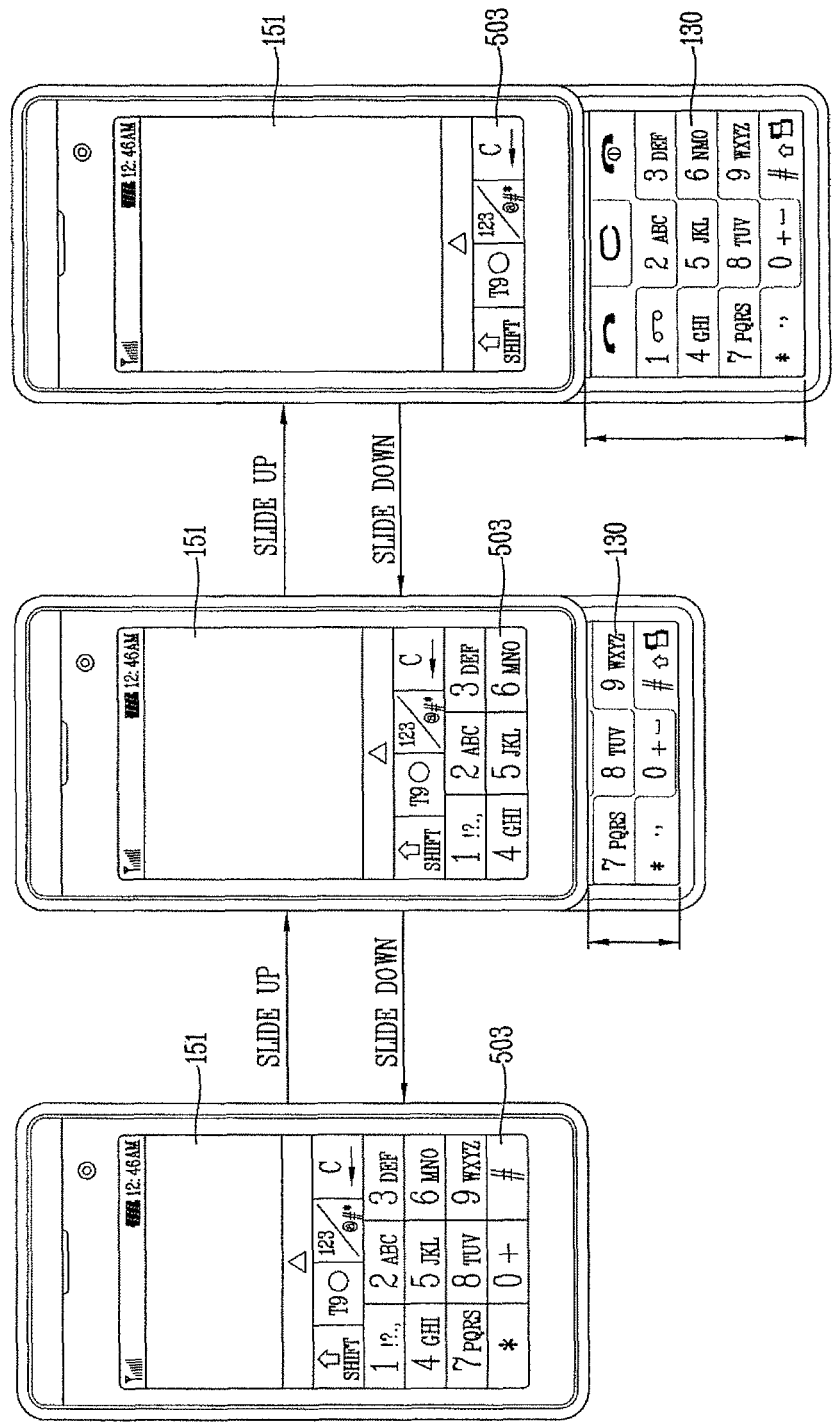
FIG. 10 is an overview of display screens illustrating a method for controlling the input device according to a slid state of the mobile terminal according to an embodiment of the present invention.

FIG. 10 is an overview of display screens illustrating a method for controlling the input device according to a slid state of the mobile terminal according to an embodiment of the present invention.

When the input device is activated for a data input in a state that the mobile terminal 100 is in the closed configuration, the controller 180 displays the keypad icon 503 on the display unit 151. At this time, the sensing unit 140 detects the slide state and transmits the detected result to the controller 180. Namely, the sensing unit detects sliding down and informs the controller 180 accordingly.

Thereafter, when the mobile terminal 100 is slid up, the sensing unit 140 detects it and informs the controller 180 accordingly. The controller 180 detects the sliding up via the sensing unit 140 and moves the keypad icon 503 displayed on the display unit 151 according to the level of sliding up.

In other words, when the first body 200 of the mobile terminal 100 is slid in one direction, the controller 180 moves the keypad icon 503 according to an exposure degree of the user input unit 130 of the second body 205 which is exposed according to the slidable movement and displays it accordingly.

For example, when the first body 200 of the mobile terminal 100 is slid in one direction, the controller 180 moves the keypad icon 503 displayed on the display screen according to the sliding degree. At this time, when two lower rows of the keys constituting the touch keypad of the user input unit 130 are exposed according to the sliding operation, the controller 180 moves the keypad icon 503 displayed on the display screen in one direction. Here, the controller 180 may implement such an effect that a portion of the keypad icon 503 disappears based on the boundary of the display screen according to the movement of the keypad icon 503.

In other words, when two rows of the touch keypad of the user input unit 130 are exposed, two rows of the keypad icon 503 displayed on the display screen are concealed. Namely, the two exposed rows of the touch keypad and the two concealed rows of the keypad icon 503 are consistent with each other.

Figure 11:
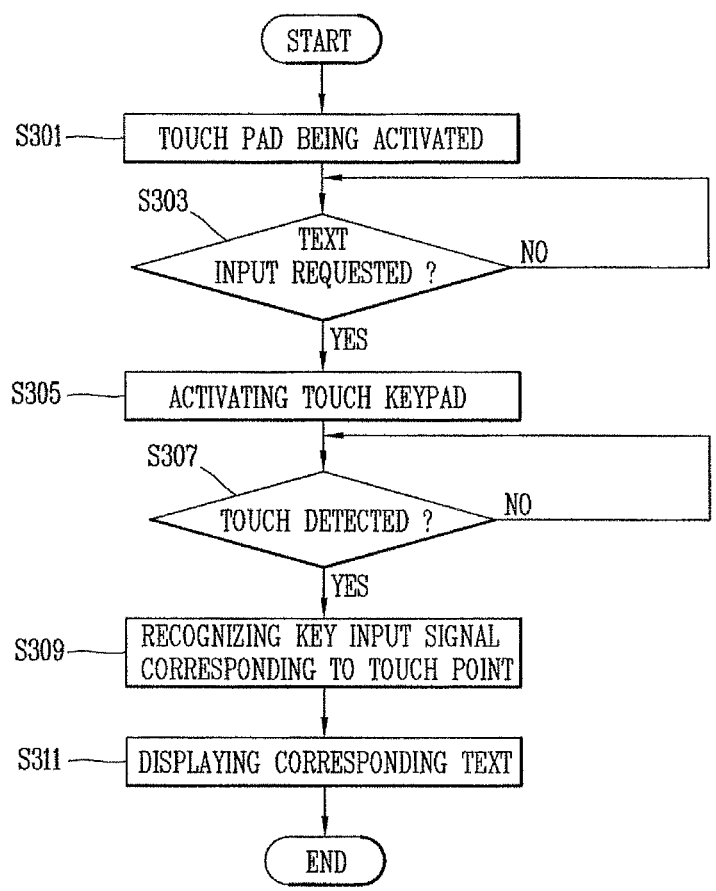
FIG. 11 is a flow chart illustrating a method for controlling the input device of the mobile terminal according to still another embodiment of the present invention.

FIG. 11 is a flow chart illustrating a method for controlling the input device of the mobile terminal according to still another embodiment of the present invention.

First, with the touch pad mode of the user input unit 130 activated, when a text input is requested (S301, S303), the controller 180 deactivates the touch pad mode of the user input unit 130 and activates the touch keypad mode (S305). Namely, the user input unit 130 operates as the touch keypad.

Thereafter, when a touch applied to the user input unit 130 activated in the touch keypad mode is detected, the controller 180 recognizes it as a text input and recognizes a key input corresponding to the detected touched point (S307, S309). And the controller 180 displays text (Hangul, English, number, special symbols, and the like) allocated to the inputted key on the display screen (S311).

Figure 12:
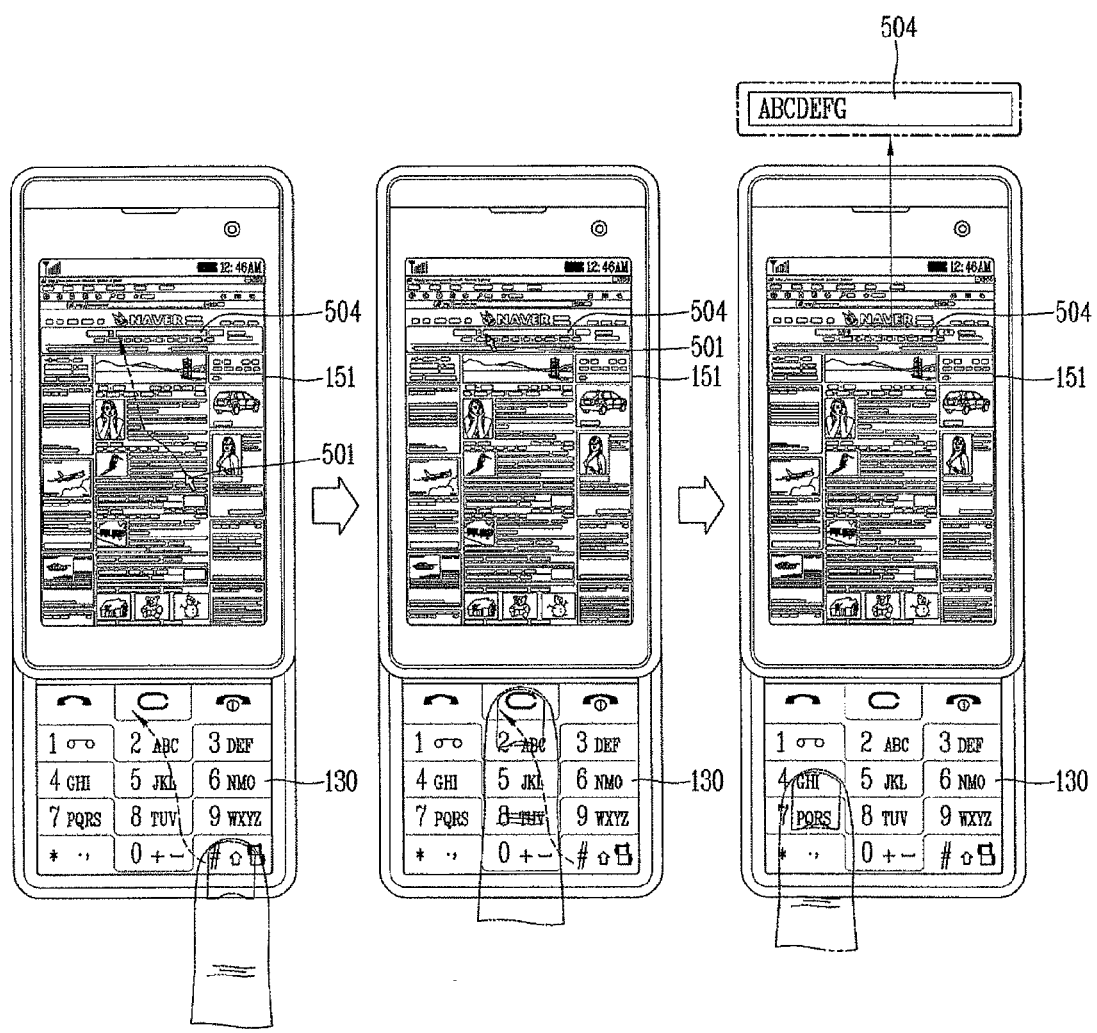
FIG. 12 is an overview of display screens illustrating an example of controlling the input device of the mobile terminal according to the embodiment of FIG. 11.

FIG. 12 is an overview of display screens illustrating an example of controlling the input device of the mobile terminal according to the embodiment of FIG. 11.

First, when a Web browser function is selected by a user input, the controller 180 connects to a Web site via the wireless Internet module 113. Namely, the controller 180 drives the Web browser according to the user input. And, the controller 180 displays a Web page received from the connected Web site on the display screen.

In addition, the controller 180 checks whether a user is to be used for the corresponding function, and if the cursor is to be used, the controller 180 displays the cursor 501 on the Web page displayed on the display screen.

Thereafter, when a touch applied to the user input unit 130 is detected, the controller 180 controls the cursor 501 based on the detected touch input. For example, when the contact point is moved in a state that a pointer is in contact with the user input unit 130, the controller 180 moves the cursor 501 according to the movement of the contact point of the pointer. Accordingly, the user can move the cursor 501 to a desired position on the Web page through dragging.

After the cursor is moved to a text input window 504 on the Web page, when the text input window 502 is selected, the controller 180 establishes an environment for receiving text. Namely, the controller 180 deactivates the touch pad mode of the user input unit 130 and activates the touch keypad mode.

With the touch keypad mod activated, when a touch applied to the user input unit 130 is detected, the controller 180 recognizes it as a key input corresponding to the detected touched point and displays corresponding text on the text window. As shown, when a touch applied to a key region allocated 'G', the controller 180 inputs 'G' to the text input window 504.

Figure 13:
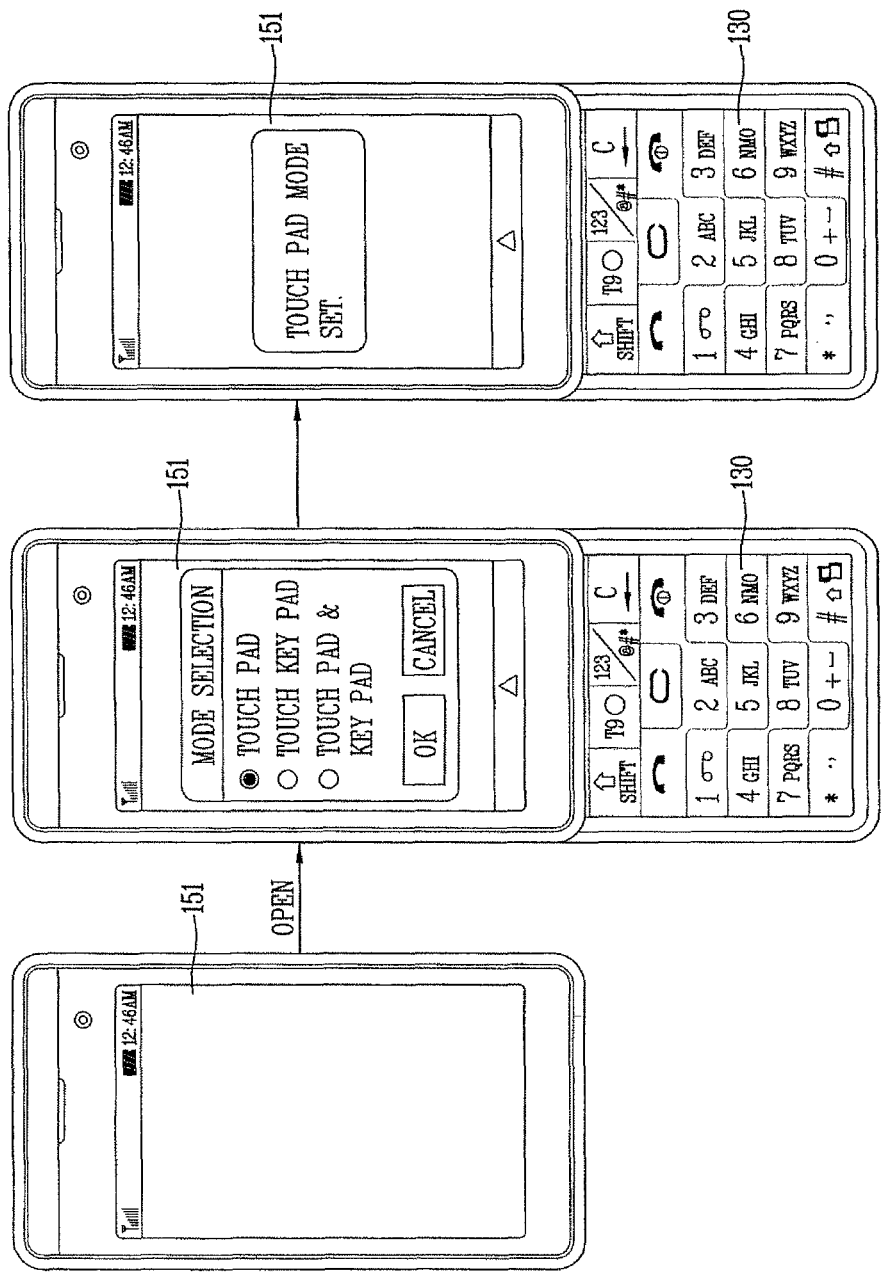
FIG. 13 illustrates a method for controlling the input device of the mobile terminal according to an embodiment of the present invention.

FIG. 13 illustrates a method for controlling the input device of the mobile terminal according to an embodiment of the present invention.

First, the sensing unit 140 detects a slide state of the mobile terminal 100, and transmits a corresponding result to the controller 180. When the slide state is changed from the closed configuration to the open configuration, the controller 180 displays a setting screen image allowing selecting of an operation mode of the user input unit 130.

When an operation mode of the user input unit 130 is selected from the displayed setting screen and the selected mode is different from a previous operation mode, the controller 180 changes the operation mode of the user input unit 130 to the selected operation mode. At this time, the controller 180 may display a notification message informing that the operation mode of the user input unit 130 is changed.

Thereafter, the controller 180 may execute a particular function according to a touch input applied via the user input unit 130 or move the cursor displayed on the display screen.

In this embodiment, the case where the operation mode of the user input unit 130 is selected when the slide of the mobile terminal 100 is open is taken as an example, but it may be implemented such that the operation mode of the user input unit 130 can be selected when the slide of the mobile terminal 100 is closed.

As so far described, the mobile terminal according to at least one embodiment of the present invention can provide the input device that can be used as the touch keypad and/or the touch pad. Accordingly, the present invention can provide a suitable input device according to an operation mode of the mobile terminal.

In addition, the operation mode of the input device can be controlled according to an application program.

Also, a particular function can be executed only through drag input (gesture) without viewing the display screen.

Moreover, because the cursor (mouse pointer) is controlled by using the input device as a touch pad in Web browsing, a particular object of a small area can be selected, allowing the user to perform Web browsing conveniently.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

The mobile terminal according to the embodiments of the present invention is not limited in its application of the configurations and methods, but the entirety or a portion of the embodiments can be selectively combined to be configured into various modifications.

The invention claimed is:

1. A mobile terminal comprising:
a physical keypad that includes a first portion and a second portion;
a detector;
a display screen; and
a controller to control the display screen to:
display a virtual keypad emulating the physical keypad that includes the first portion and the second portion on the display screen when the detector detects that the mobile terminal is in a closed state, wherein both the first portion and the second portion of the physical keypad are inaccessible during the closed state of the mobile terminal; and
convert the virtual keypad to emulate only the second portion of the physical keypad on the display screen when the detector detects that the mobile terminal is in a partially open state where the first portion of the physical keypad is accessible but the second portion of the physical keypad is inaccessible, wherein the first portion of the physical keypad and the virtual keypad emulating the second portion of the physical keypad are simultaneously activated during the partially open state of the mobile terminal.

2. The mobile terminal of claim 1, wherein the physical keypad comprises a plurality of characters.

3. The mobile terminal of claim 2, wherein the plurality of characters comprises at least one of a number, a letter, or a symbol.

4. The mobile terminal of claim 1, wherein the detector detects a sliding state of the mobile terminal to determine whether the mobile terminal is in the closed state, the partially open state, or an open state.

5. The mobile terminal of claim 1, wherein the first portion of the physical keypad comprises at least one row of touch keys, and the second portion of the physical keypad comprises at least one row of touch keys.

6. The mobile terminal of claim 1, wherein the controller is further configured to remove the virtual keypad from the display screen when the detector detects that the mobile terminal is in an open state.

7. A method of a mobile terminal, comprising:
displaying a virtual keypad emulating a physical keypad of the mobile terminal that includes a first portion and a second portion on a display screen of the mobile terminal when the mobile terminal is in a closed state, wherein both the first portion and the second portion of the physical keypad are inaccessible during the closed state of the mobile terminal; and
converting the virtual keypad to emulate only the second portion of the physical keypad on the display screen when the mobile terminal is in a partially open state where only the first portion of the physical keypad is accessible, wherein the first portion of the physical keypad and the virtual keypad emulating the second portion of the physical keypad are simultaneously activated during the partially open state of the mobile terminal.

8. The method of claim 7, wherein the physical keypad comprises a plurality of characters.

9. The method of claim 8, wherein the plurality of characters comprises at least one of a number, a letter, or a symbol.

10. The method of claim 7, wherein the detector detects a sliding state of the mobile terminal to determine whether the mobile terminal is in the closed state, the partially open state, or an open state.

11. The method of claim 7, wherein the first portion of the physical keypad comprises at least one row of touch keys, and the second portion of the physical keypad comprises at least one row of touch keys.

12. The method of claim 7, wherein the controller is further configured to remove the virtual keypad from the display screen when the detector detects that the mobile terminal is in an open state.

\* \* \* \* \*